United States Patent
Hatasawa

(10) Patent No.: US 8,730,310 B2
(45) Date of Patent: May 20, 2014

(54) REPRODUCING DEVICE, REPRODUCTION CONTROL METHOD AND PROGRAM

(75) Inventor: Yasunari Hatasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 13/044,531

(22) Filed: Mar. 9, 2011

(65) Prior Publication Data

US 2011/0228058 A1 Sep. 22, 2011

(30) Foreign Application Priority Data

Mar. 17, 2010 (JP) ................. 2010-061172

(51) Int. Cl.
*H04N 13/04* (2006.01)
(52) U.S. Cl.
USPC ........................................................... 348/51
(58) Field of Classification Search
None
See application file for complete search history.

(56) References Cited

U.S. PATENT DOCUMENTS

| 2009/0142041 | A1* | 6/2009 | Nagasawa et al. | 386/124 |
| 2009/0315884 | A1* | 12/2009 | Lee et al. | 345/419 |
| 2010/0039504 | A1* | 2/2010 | Takahashi et al. | 348/54 |

FOREIGN PATENT DOCUMENTS

JP 2006-126501 5/2006

* cited by examiner

*Primary Examiner* — Joseph Ustaris
*Assistant Examiner* — Jill Sechser
(74) *Attorney, Agent, or Firm* — Finnegan, Henderson, Farabow, Garrett & Dunner, L.L.P.

(57) ABSTRACT

A reproducing device includes a reproducing section that reproduces a two-dimensional video and a three-dimensional video recorded on a predetermined video recording medium, and a reproduction controller that controls to reproduce a three-dimensional test video for confirmation of stereovision by a viewer before reproducing the three-dimensional video, when the video reproduced by the reproducing section is switched from the two-dimensional video to the three-dimensional video.

7 Claims, 5 Drawing Sheets

REPRODUCING DEVICE, REPRODUCTION CONTROL METHOD AND PROGRAM

BACKGROUND OF THE INVENTION

1. Field of the Invention

The present invention relates to a reproducing device, a reproduction control method and a program, and more particularly, to a reproducing device, a reproduction control method and a program to enable a viewer to view a three-dimensional video in stereovision from the beginning.

2. Description of the Related Art

Recently, the use of television receivers such as LCDs (Liquid Crystal Display) and PDPs (Plasma Display Panel) called flat panel displays have been spreading widely. Furthermore, terrestrial digital broadcasting began from December 2003, such that a viewer can view hi-vision broadcasting with high image quality at home. In addition, a recording and reproducing device compatible with hi-vision has been spreading quickly, such that an environment where it is possible to view hi-vision broadcasting, as well as package media with hi-vision image quality has been becoming prepared. In these circumstances, a flat panel display where it is possible to view three-dimensional video contents has been sequentially introduced.

Three-dimensional video viewing methods can be largely classified into two types, that is, an eyeglasses type, wearing polarization filter eyeglasses or shutter eyeglasses, and an unaided eye type not wearing eyeglasses such as a lenticular type or a parallax barrier type (see Japanese Unexamined Patent Application Publication No. 2006-126501). Among them, from the viewpoint of compatibility with two-dimensional video displays, in a standard home, it is expected that a viewing type by an eyeglasses type will be spread in the near future.

SUMMARY OF THE INVENTION

In a standard home, it is generally considered that a viewer mainly views two-dimensional videos, such that it is necessary to make preparations for viewing, for example, wearing stereovision eyeglasses or the like, in case of viewing the three-dimensional video by the eyeglasses type. When the three-dimensional video is displayed on a display, before the preparations for viewing the three-dimensional video are made, there is a problem that the viewer may not view the three-dimensional video contents from the beginning.

The invention has been made in consideration of such circumstances and it is desirable to enable the viewer to view the three-dimensional video in stereovision from the beginning.

According to an embodiment of the invention, there is provided a reproducing device including a reproducing section that reproduces a two-dimensional video and three-dimensional video recorded on a predetermined video recording medium, and a reproduction controller that controls to reproduce a three-dimensional test video for a viewer to confirm stereovision before reproducing the three-dimensional video, when the video reproduced by the reproducing section is switched from the two-dimensional video to the three-dimensional video.

According to another embodiment of the invention, there is provided a reproduction control method including the steps of controlling a reproducing device, which includes a reproducing section that reproduces a two-dimensional video and three-dimensional video recorded on a predetermined video recording medium and a reproduction controller that controls the reproduction of the reproducing section, to reproduce a three-dimensional test video for a viewer to confirm stereovision before reproducing the three-dimensional video, when the video reproduced by the reproducing section is switched from the two-dimensional video to the three-dimensional video.

According to still another embodiment, there is provided a program allowing a computer controlling the reproduction of two-dimensional videos and three-dimensional videos to execute controlling to reproduce a three-dimensional test video for a viewer to confirm stereovision before reproducing the three-dimensional video, when the reproduced video is switched from the two-dimensional video to the three-dimensional video.

According to the embodiments of the invention, when the reproduced video is switched from the two-dimensional video to the three-dimensional video, the reproduced video may be controlled to reproduce a three-dimensional test video for a viewer to confirm stereovision before reproducing the three-dimensional video.

In addition, the program may be provided by being transmitted via a transmission medium or by being recorded on a recording medium.

The reproducing device may be an independent device or an internal block constituting one device.

According to the embodiments of the invention, the viewer may view the three-dimensional video in stereovision from the beginning.

DESCRIPTION OF THE PREFERRED EMBODIMENTS

Configuration Example of Reproducing Device Adopting Embodiment of Invention

Figure 1:
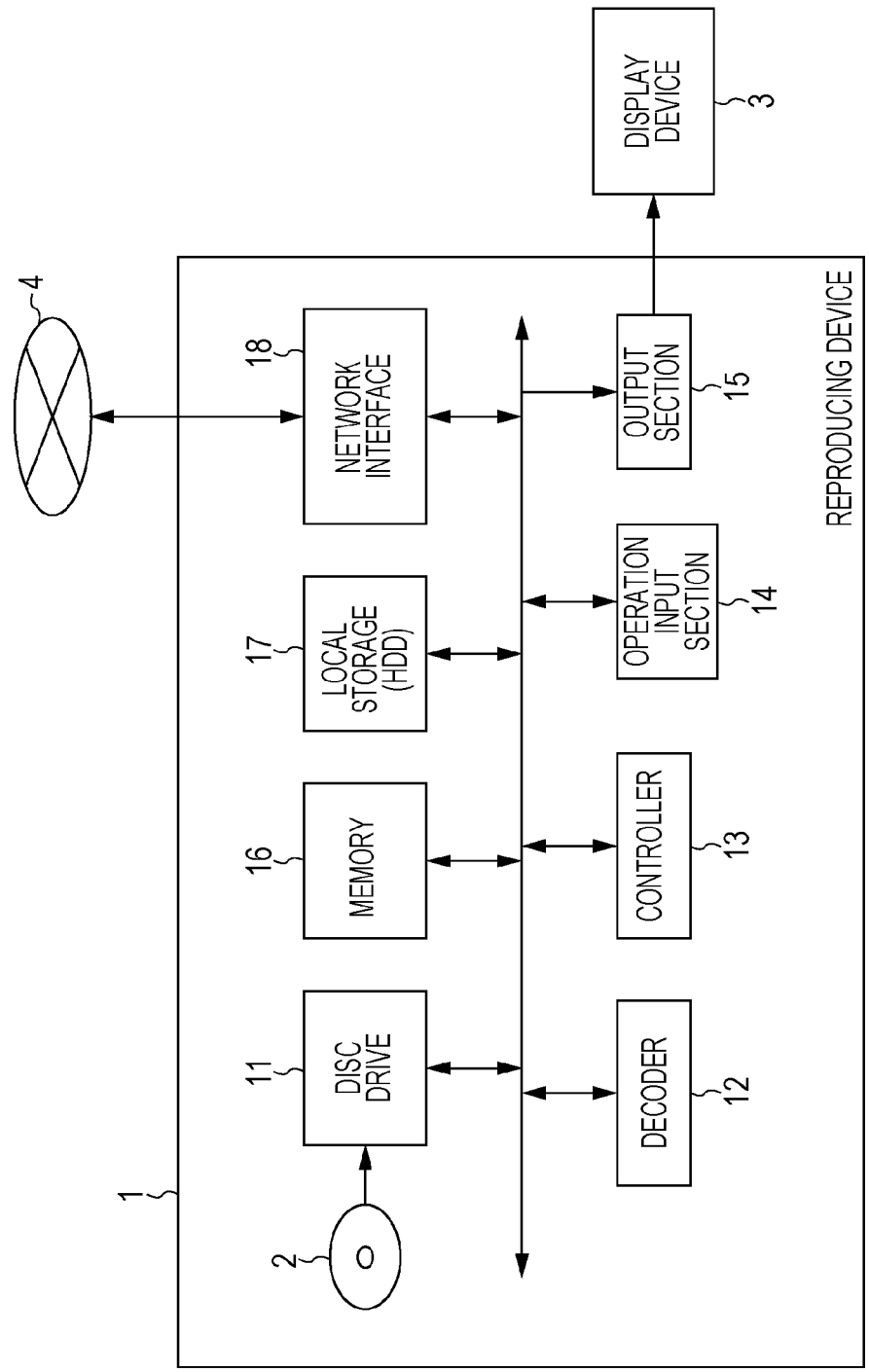
FIG. 1 is a block diagram representing a configuration example of a reproducing device according to an embodiment of the invention.

FIG. 1 shows a configuration example of the reproducing device according to an embodiment of the invention.

The reproducing device 1 is a device that reproduces two-dimensional video contents and three-dimensional video contents recorded on a video recording medium 2 to display the video of the two-dimensional video contents and three-dimensional video contents on an external display device 3. In addition, the reproduction of the contents recorded on the video recording medium 2 means, to be exact, the reproduction of data of the contents (contents data), but it is appropriately referred to as the reproduction of contents in this specification.

In this embodiment, the video recording medium 2 on which the data reproduced by the reproducing device 1 is recorded is described as an optical disc, for example, a DVD (Digital Versatile Disc) or Blu-ray (registered trade mark)

Disc. However, the video recording medium 2 may be a semiconductor memory such as a flash memory, a hard disc or the like.

In addition, as data of the two-dimensional video content and three-dimensional video content, video data and voice data are recorded on the video recording medium 2, but the description of the voice data will be appropriately omitted.

A disc drive 11 reads MPEG-TS (Moving Picture Experts Group-Transport Stream) as contents data recorded on the video recording medium 2 and supply it to a decoder 12. Furthermore, when the disc drive 11 reads a playlist including details included in the contents, a reproduction sequence or the like from the video recording medium 2, the disc drive 11 supplies the read details to a controller 13.

The decoder 12 decodes the MPEG-TS supplied from the disc drive 11 and supplies video data of the two-dimensional video contents and three-dimensional video contents, which are obtained through the decoding, to an output section 15.

The video data of three-dimensional video contents includes data of a left eye video (hereinafter, referred to as an "L video") and data of a right eye video (hereinafter, referred as an "R video"), and the L video and the R video are alternately displayed in a display device 3. A viewer (user) wears stereovision eyeglasses and views the video of the three-dimensional video contents. The stereovision eyeglasses have a shutter function where the left side and the right side alternately open and shut, such that a left eye shutter and a right eye shutter alternately open and shut in synchronization with the L video and R video displayed in the display device 3. Parallax is set to the L video and R video, and the viewer can perceive in three dimensions the video displayed on the display device 3 by viewing the L video and R video corresponding independently to the left eye and right eye, respectively.

The video data of the three-dimensional video contents is encoded by, for example, a H.264 AVC (Advanced Video Coding)/MVC (Multi-view Video Coding), compressed and recorded to be stored in a reduced data capacity.

In the H.264 AVC/MVC, a video stream called a Base view video and a video stream called a Dependent view video are defined. Hereinafter, appropriately, the H.264 AVC/MVC is only referred as MVC.

The MVC performs the encoding by using not only prediction between images that are in the time direction, but also prediction between streams (views).

Specifically, with respect to the MVC, the prediction encoding using another stream as a reference video is not permitted in the Base view video, but the prediction encoding using the Base view video as the reference video is permitted in a Dependent view video. Therefore, for example, the encoding in which the L video becomes the Base view video and the R video becomes the Dependent view video as the video data of the three-dimensional video contents is performed. In this case, with respect to the R video, the prediction encoding based on the L video is performed, such that a data amount of Dependent view video stream is reduced more than that of the Base view video stream.

In addition, due to the encoding in the H.264/AVC, the prediction in a time direction is performed with respect to the Base view video. Furthermore, with respect to the Dependent view video, the prediction in a time direction is performed along with the prediction between views. To decode the Dependent view video, the decoding of corresponding Base view video, which is a reference destination at the time of encoding, has to be terminated in advance.

In the video data of the three-dimensional video contents, the data of the L video and R video may be recorded on the video recording medium 2 in a different MPEG-TS, respectively, or may be recorded as one MPEG-TS. Furthermore, with respect to the data of the L video and the R video, either data of the L video or R video may be recorded on the video recording medium 2 in a form of depth information with the other data. In this case, based on the depth information, the other data of the L video or R video, which is not recorded, is generated by the controller 13 or the like.

The controller 13 controls the reproducing operation of the reproducing device 1 by a control program recorded on a memory 16 or a local storage 17 according to an operation command from the operation input section 14.

For example, the controller 13 instructs the disc drive 11 on which the video recording medium 2 is loaded to read data, and the read data is supplied to the decoder 12, the controller 13 or the like.

The operation input section 14 is constructed by an input device such as a button, a key, a touch panel, a jog dial and a mouse, or a receiver that receives a signal such as infrared rays transmitted from a remote commander (not shown). The operation input section 14 detects a viewer's operation and supplies the controller 13 with an operation signal representing the details of the detected operation.

The output section 15 has a built-in D/A converter and outputs contents data supplied from the decoder 12 or the like to the display device 3 as an analog or digital AV signal. The output section 15 has as an output terminal, for example, an HDMI (High-Definition Multimedia Interface) output terminal that outputs an AV signal by an HDMI signal, an output terminal that outputs the AV signal by a component signal, or the like.

The memory 16 stores data that is necessary to be temporary stored for the recording and reproducing operation of the reproducing device 1.

The local storage 17 is constructed by, for example, an HDD (Hard Disk Drive). The local storage 17 stores a control program for executing a recording and reproducing operation or the like.

A network interface 18 performs communication with a server (not shown) via a network 4 according to a control of the controller 13 and supplies data (data of the control program or the like) downloaded from the server to the local storage 17.

The reproducing device 1 constructed as described above reproduces two-dimensional video contents or three-dimensional video contents recorded on the video recording medium 2 and displays a video obtained thereby on the display device 3, based on the viewer's operation indicating a reproduction.

On the video recording medium 2, either the two-dimensional video contents or three-dimensional video contents may be recorded, or all of the two-dimensional video contents and three-dimensional video contents may be recorded.

Even when only the three-dimensional video contents is included (recorded) as a feature presentation on the video recording medium 2, a reproduction menu screen or the like, which is commonly displayed when the video recording medium 2 loaded on the reproducing device 1 is first read, is a two-dimensional video. Therefore, generally, the viewer views a video of the three-dimensional video contents after a video of the two-dimensional video contents is displayed on the display device 3.

In an eyeglasses type where the viewer wears the stereovision eyeglasses to view the video of the three-dimensional video contents, there is necessary a predetermined preparation time such as the time taken for the viewer to wear the eyeglasses and the time taken for the eyeglasses to be synchronized with a shutter synchronizing signal, which is transmitted form the display device 3.

Here, in a case where the video of the three-dimensional video contents recorded on the video recording medium 2 is displayed on the display device 3, the reproducing device 1 displays the video on the display device 3 after confirming whether or not the viewer is ready to view the three-dimensional video contents.

[Functional Block Diagram of Reproducing Device 1]

Figure 2:
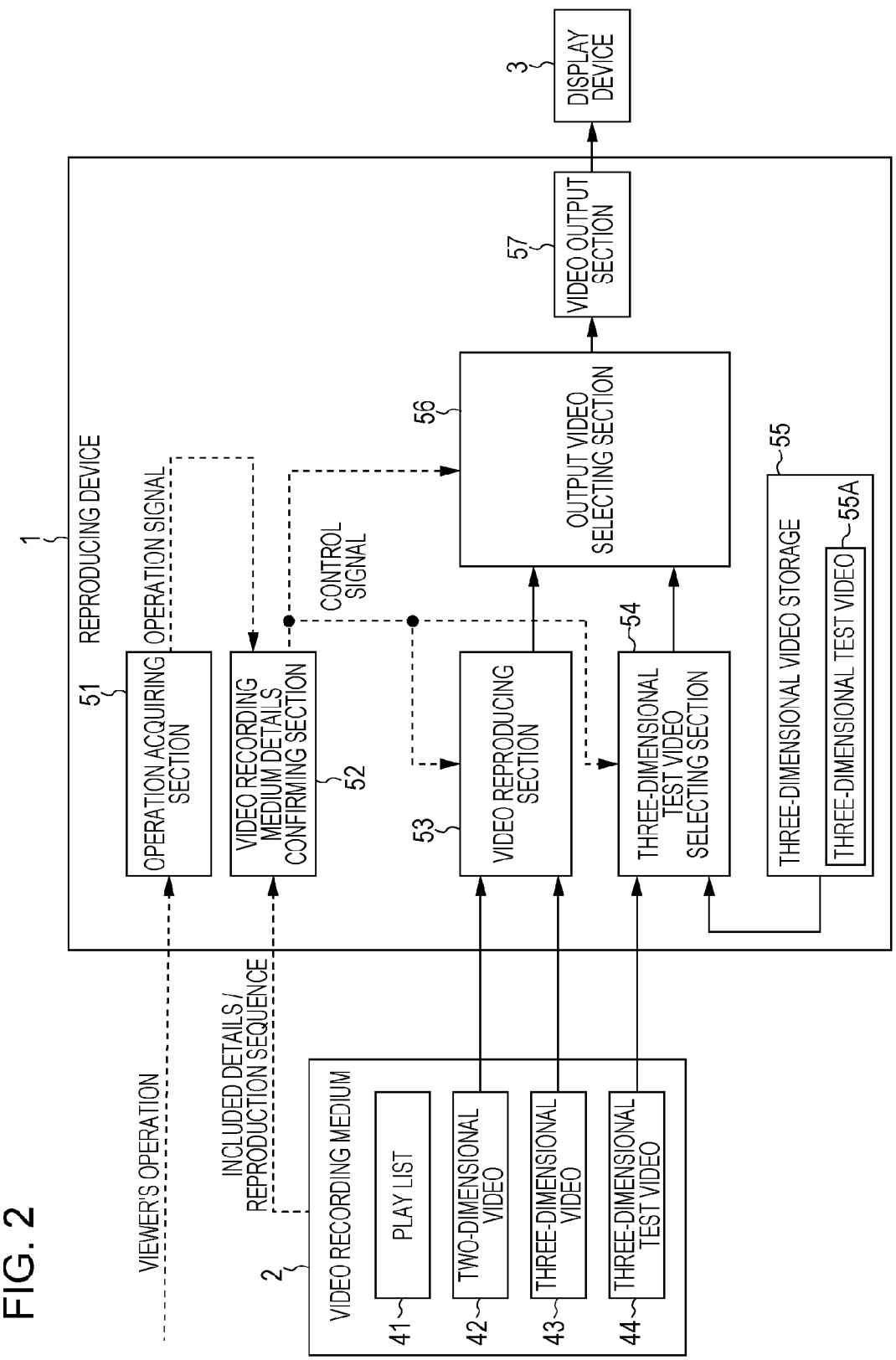
FIG. 2 is a block diagram representing a functional configuration example of the reproducing device.

FIG. 2 is a block diagram representing a functional configuration example of a case where the reproducing device 1 performs the reproduction of the three-dimensional video contents recorded on the video recording medium 2.

The reproducing device 1 includes an operation acquiring section 51, a video recording medium details confirming section 52, a video reproducing section 53, a three-dimensional test video selecting section 54, a three-dimensional test video storage 55, an output video selecting section 56, and a video output section 57.

A playlist 41 describing included details or a reproduction sequence of the recorded contents, a two-dimensional video 42, a three-dimensional video 43, and a three-dimensional test video 44 are recorded on the video recording medium 2 loaded on the reproducing device 1.

The two-dimensional video 42 is a video of one sheet or more that makes a viewer appreciate as a two-dimensional video, for example, moving picture contents such as a movie, a broadcast program, or animation, a reproduction menu screen, a logo mark screen of a movie distributor, or a broadcasting station, various setting screens, or the like. The three-dimensional video 43 is a video of one sheet or more that makes a viewer appreciate as a three-dimensional video by an L video and an R video, for example, moving picture contents such as a movie, a broadcast program, an animation, a landscape picture, or the like. The three-dimensional test video 44 is a test video constituted by the L video and R video, which is used by a viewer for confirming stereovision. In addition, the three-dimensional test video 44 may be omitted and thereby it may not be recorded on the video recording medium 2.

The operation acquiring section 51 acquires an operation performed by a viewer and supplies an operation signal corresponding to the operation to the video recording medium details confirming section 52.

The video recording medium details confirming section 52 controls the video reproducing section 53, the three-dimensional test video selecting section 54 and the output video selecting section 56 based on the playlist 41 read from the video recording medium 2 or the operation signal. For example, video recording medium details confirming section 52 performs a control so that the three-dimensional test video 44 is reproduced before reproducing the three-dimensional video 43, when a switch from the two-dimensional video 42 to the three-dimensional video 43 is detected based on the playlist 41 or the operation signal. In addition, in FIG. 2, a dotted line representing a control signal from the video recording medium details confirming section 52 to each section is indicated collectively as one dotted line for visibility.

The video reproducing section 53 reproduces either the two-dimensional video 42 or the three-dimensional video 43 recorded on the video recording medium 2 based on the control of the video recording medium details confirming section 52 and supplies the video data, which can be obtained from the reproduction, to the output video selecting section 56.

The three-dimensional test video selecting section 54 selects either the three-dimensional test video 44 recorded on the video recording medium 2 or a three-dimensional test video 55A recorded in the three-dimensional test video storage 55 based on the control of the video recording medium details confirming section 52. The three-dimensional test video selecting section 54 reads the video data of the selected three-dimensional test video and supplies the read video data to the output video selecting section 56.

In a case where the three-dimensional test video 44 is recorded on the video recording medium 2, a control signal indicating the selection of the three-dimensional test video 44 is supplied from the video recording medium details confirming section 52 to the three-dimensional test video selecting section 54. On the other hand, in a case where the three-dimensional test video 44 is not recorded on the video recording medium 2, the three-dimensional test video selecting section 54 is supplied with a control signal causing it to read the three-dimensional test video 55A stored in the three-dimensional test video storage 55 and to supply the read test video to the output video selecting section 56. The video recording medium details confirming section 52 can determine whether or not the three-dimensional test video 44 is recorded on the video recording medium 2 by confirming the playlist 41.

The three-dimensional test video 55A is stored in the three-dimensional test video storage 55 for a case where the three-dimensional test video 44 is not recorded on the video recording medium 2. Hereinafter, the three-dimensional test video 55A stored in the three-dimensional test video storage 55 is referred to as an embedded three-dimensional test video 55A to be discriminated from the three-dimensional test video 44 recorded on the video recording medium 2.

The output video selecting section 56 selects either the video data from the video reproducing section 53 or the video data from the three-dimensional test video selecting section 54 based on the control of the video recording medium details confirming section 52 and supplies the selected video data to the video output section 57. Specifically, the output video selecting section 56 selects a feature presentation video of the two-dimensional video 42 or the three-dimensional video 43 and the three-dimensional test video (three-dimensional test video 44 or the embedded three-dimensional test video 55A) based on the control of the video recording medium details confirming section 52 and outputs the selected feature presentation video and test video.

The video output section 57 outputs the video data supplied from the output video selecting section 56 with a predetermined format corresponding to the display device 3.

The operation acquiring section 51 corresponds to, for example, the operation input section 14 shown in FIG. 1. The video recording medium details confirming section 52, the three-dimensional test video selecting section 54 and the output video selecting section 56 correspond to, for example, the controller 13 shown in FIG. 1. Furthermore, the video reproducing section 53 corresponds to, for example, the disc drive 11, the decoder 12 or the like shown in FIG. 1. The three-dimensional test video storage 55 corresponds to, for example, the local storage 17 shown in FIG. 1. The video output section 57 corresponds to, for example, the output section 15 shown in FIG. 1.

[State Transition Diagram]

Next, a reproduction sequence when the video reproducing device 1 reproduces the two-dimensional video 42, the three-dimension video 43, and the three-dimensional test video 44 recorded on the video recording medium 2 will be described with reference to FIG. 3.

Figure 3:
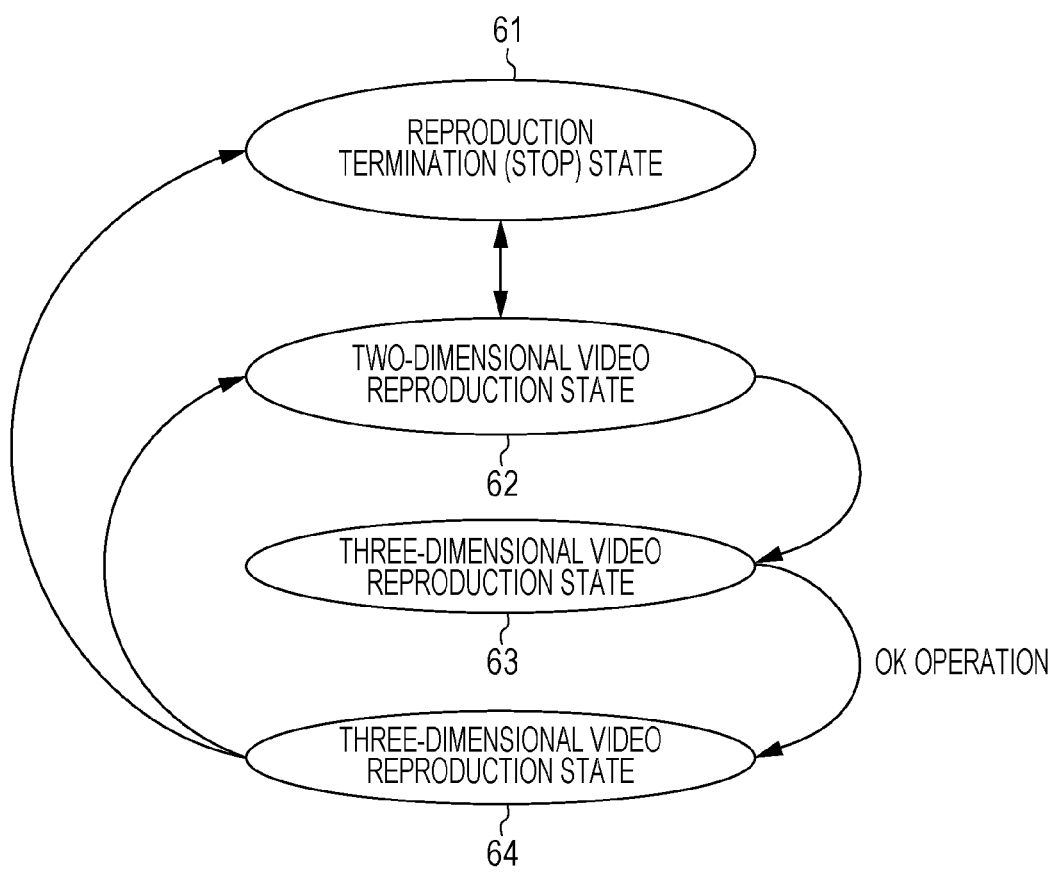
FIG. 3 is a state transition diagram of the reproducing device.

FIG. 3 shows a state transition diagram of the video reproducing device 1 at the time of reproducing the two-dimensional video 42, the three-dimensional video 43, and the three-dimensional test video 44, respectively.

When the video recording medium 2 loaded on the reproducing device 1 is first read, the two-dimensional video 42 including a reproduction menu screen, which is first displayed, or the like, is first displayed. Therefore, when the start of reproduction is instructed by the operation of a viewer, the state of the reproducing device 1 transitions from the first reproduction termination (stop) state 61 to a two-dimensional video reproduction state 62 where the two-dimensional video 42 is reproduced.

From the two-dimensional video reproduction state 62, when the three-dimensional video 43 is made to attempt to be reproduced according to a description of the playlist 41 or an operation by a viewer, the reproduction device 1 transitions in advance to a three-dimensional test video reproduction state 63 instead of transitioning directly to a three-dimensional video reproduction state 64. At the three-dimensional test video reproduction state 63, the three-dimensional test video 44 recorded on the video recording medium 2 is reproduced. In addition, when the three-dimensional test video 44 is not recorded on the video recording medium 2, the embedded three-dimensional test video 55A is reproduced.

During the three-dimensional test video reproduction state 63, when a viewer wears stereovision eyeglasses and the synchronization of the shutters of the eyeglasses is completed and thereby a viewer can perceive the three-dimensional test video in three dimensions, the viewer performs an operation, for example, pressing an OK button of a remote commander or the like, which indicates that preparations are completed.

According to the viewer's operation indicating that preparations are completed, the reproducing device 1 transitions from the three-dimensional test video reproducing state 63 to the three-dimensional video reproducing state 64 where the three-dimensional video 43 is reproduced.

When the two-dimensional video 42 is made to attempt to be reproduced by a description of the playlist 41 or a viewer's operation from the three-dimensional video reproduction state 64, the reproducing device 1 immediately transitions to the two-dimensional video reproduction state 62. In addition, when an object to be reproduced is not present after the reproduction of the three-dimensional video 43 is terminated, according to the description of the playlist 41 or the viewer's operation, the reproducing device 1 immediately transitions to the reproduction termination state 61.

As described above, when the object to be reproduced is switched from the two-dimensional video 42 to the three-dimensional video 43, the reproducing device 1 certainly displays the three-dimensional test video 44. When the three-dimensional test video 44 is displayed, the reproducing device 1 waits until the viewer's operation indicating that preparations are completed is performed, and starts to reproduce the three-dimensional video 43 when the operation is performed.

On the other hand, when the object to be reproduced is switched from the three-dimensional video 43 to the two-dimensional video 42, the reproducing device 1 immediately starts to reproduce the two-dimensional video 42.

[Example of Three-Dimensional Test Video 44]

Figure 4:
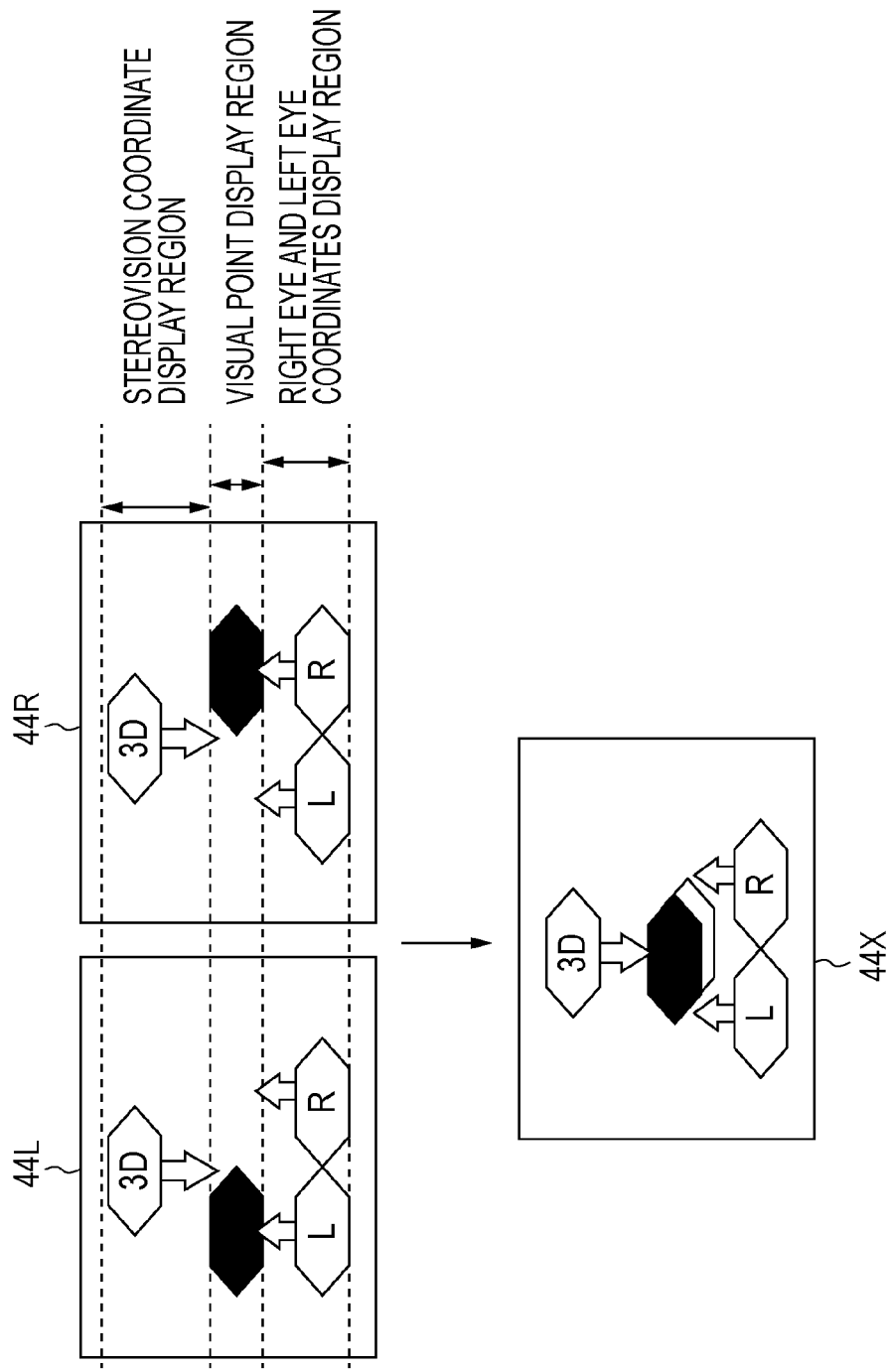
FIG. 4 is a view illustrating an example of a three-dimensional test video.

FIG. 4 shows an example of the three-dimensional test video 44.

The three-dimensional test video 44 includes a left eye three-dimensional test video 44L and a right eye three-dimensional test video 44R.

As shown in FIG. 4, the three-dimensional test video 44L and the three-dimensional test video 44R have right eye and left eye coordinates display region, a visual point display region, and a stereovision coordinate display region, respectively.

The visual point display region is a region where each of the videos viewed independently by the left eye and right eye for stereovision is displayed. The right eye and left eye coordinates display region is a region where a position of the video displayed in the visual point display region is shown. The stereovision coordinate display region is a region where a position of the video is shown when each of the right eye video and left eye video displayed in the visual point display region is brought into fusion in a person's brain.

Specifically, in the visual point display region of the three-dimension test video 44R for the right eye, an object video for stereovision (stereovision object video) is drawn in the same horizontal position as that of a hexagonal video depicted by "R" in the right eye and left eye coordinates display region. In addition, in the example shown in FIG. 4, the stereovision object video is a black figure having the same shape as that of a hexagon depicted by "R".

Furthermore, in the visual point display region of the three-dimension test video 44L for the left eye, an object video for stereovision (stereovision object video) is drawn in the same horizontal position as that of a hexagonal video depicted by "L" in the right eye and left eye coordinates display region.

When the three-dimensional test video 44L and the three-dimensional test video 44R are brought into fusion in a person's brain, a stereovision object video is perceived like a viewer's perception video 44X as shown in FIG. 4. Specifically, the stereovision object video is perceived at the same horizontal position as that of a hexagonal video depicted by "3D" in the stereovision coordinate display region in a state where the depth direction is a front direction.

When the viewer can perceive the three-dimensional test video 44 such as the viewer's perception video 44X during the three-dimensional test video reproduction state 63, the viewer performs an operation indicating that preparations are completed and then the reproducing device 1 receives the operation to transition the state into the three-dimensional video reproduction state 64.

In addition, a message such as "please operate the OK button when you are ready to view three-dimensional video" may be overlaid on the three-dimensional test video 44L and the three-dimensional test video 44R.

[Flowchart of Reproduction Process]

Figure 5:
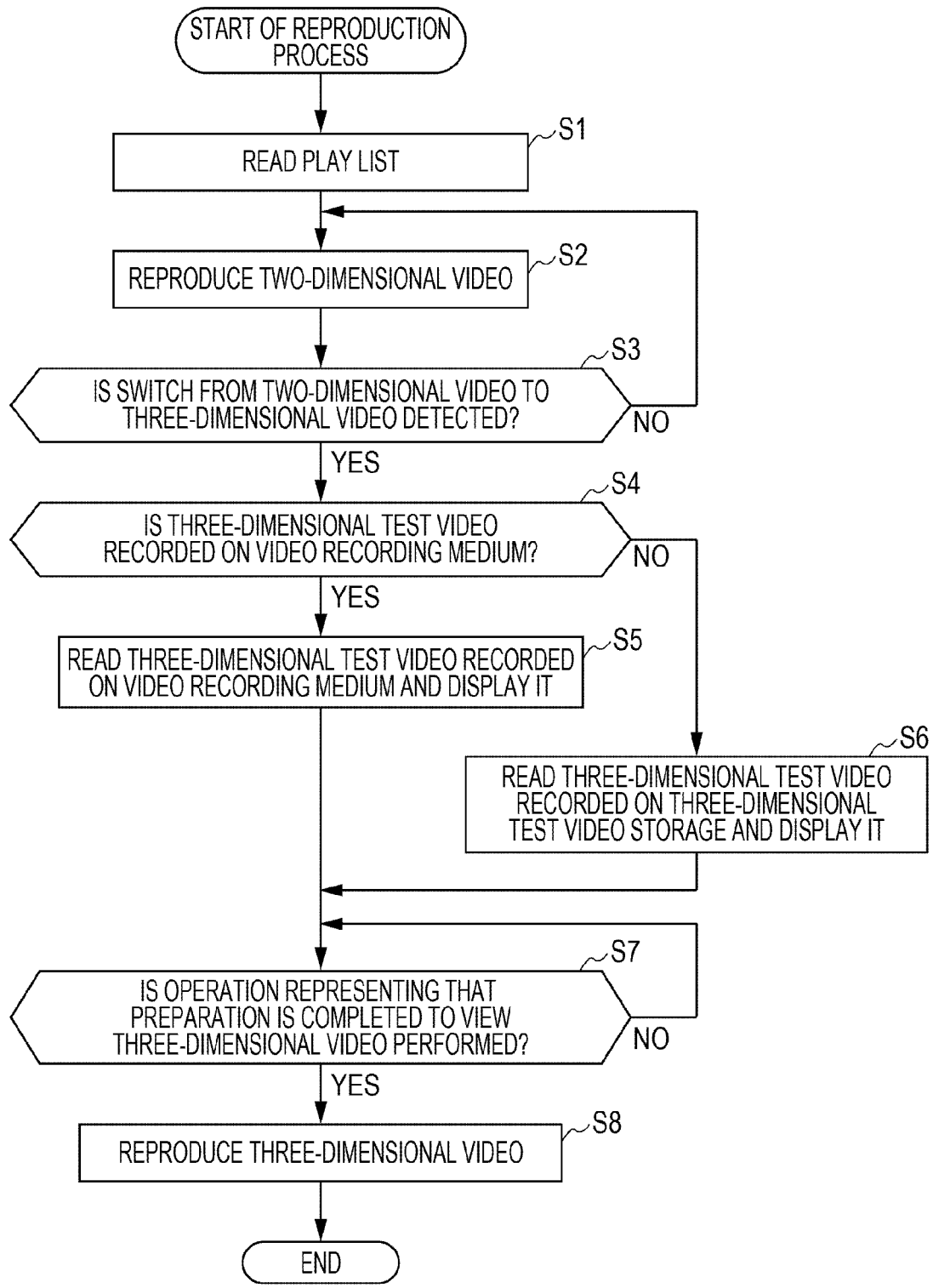
FIG. 5 is a flowchart of a reproduction process by the reproducing device.

Next, the reproduction process where the reproducing device 1 reproduces the two-dimensional video 42 and the three-dimensional video 43 recorded on the video recording medium 2 in this order will be described with reference to a flowchart of FIG. 5.

Firstly, in a step S1, the reproducing device 1 reads the playlist 41 recorded on the video recording medium 2 and recognizes the reproduction sequence of the two-dimensional video 42 and the three-dimensional video 43 recorded on the video recording medium 2.

In a step S2, the reproducing device 1 reproduces the two-dimensional video 42 recorded on the video recording medium 2 according to the reproduction sequence described in the playlist 41.

More specifically, the video recording medium details confirming section 52 instructs the video reproducing section 53 to reproduce the two-dimensional video 42 based on the playlist 41. The video reproducing section 53 reproduces the two-dimensional video 42 recorded on the video recording medium 2 and supplies the video data obtained by the reproduction to the output video selecting section 56. The output video selecting section 56 acquires the video data of the two-dimensional video 42 supplied from the video reproducing section 53, based on a control signal supplied from the video recording medium details confirming section 52, which indicates the selection of a feature presentation video, and supplies the acquired video data to the video output section 57. The video output section 57 D/A converts the video data of the two-dimensional video 42 supplied from the output video selecting section 56, if necessary, and outputs the video data to the display device 3 with a predetermined format.

In a step S3, the reproducing device 1 determines whether or not the switch of a video to be reproduced from the two-dimensional video 42 to the three-dimensional video 43 is detected. The switch of the video to be reproduced from the two-dimensional video 42 to the three-dimensional video 43 occurs, for example, in a case where the reproduction of the two-dimensional video 42 is terminated according to the reproduction sequence of the playlist 41, in a case where the termination of the reproduction of the two-dimensional video 42 and the start of the reproduction of the three-dimensional video 43 are instructed by a viewer, or the like.

In step S3, when the switch of the video from the two-dimensional video 42 to the three-dimensional video 43 is not detected, the process of step S2 is repeated. That is, the reproduction of the two-dimensional video 42 is continuously performed.

On the other hand, in step S3, when the switch of video from the two-dimensional video 42 to the three-dimensional video 43 is detected, the process proceeds to step S4 and the reproducing device 1 determines whether the three-dimensional test video 44 is recorded on the video recording medium 2 or not.

In step S4, when it is determined that the three-dimensional test video 44 is recorded on the video recording medium 2, the process proceeds to step S5 and the reproducing device 1 reads the three-dimensional test video 44 recorded on the video recording medium 2 and displays it on the display device 3.

More specifically, the video recording medium details confirming section 52 supplies a control signal indicating the selection of the three-dimensional test video 44 of the video recording medium 2 to the three-dimensional test video selecting section 54. The three-dimensional test video selecting section 54 reads the video data of the three-dimensional test video 44 from the video recording medium 2 and supplies the read video data to the output video selecting section 56. The output video selecting section 56 acquires the video data of the three-dimensional test video 44 supplied from the three-dimensional test video selecting section 54, based on a control signal supplied from the video recording medium details confirming section 52, which indicates the selection of the three-dimensional test video, and supplies the acquired video data to the video output section 57. The video output section 57 D/A converts the video data of the three-dimensional test video 44 supplied from the output video selecting section 56, if necessary, and outputs the converted video data to the display device 3 in a predetermined format.

On the other hand, in step S4, when it is determined that the three-dimensional test video 44 is not recorded on the video recording medium 2, the process proceeds to step S6 and the reproducing device 1 reads the embedded three-dimensional test video 55A recorded in the three-dimensional test video storage 55 and displays it to the display device 3.

More specifically, the video recording medium details confirming section 52 supplies a control signal indicating the selection of the embedded three-dimensional test video 55A of the three-dimensional test video storage 55 to the three-dimensional test video selecting section 54. The three-dimensional test video selecting section 54 reads the video data of the embedded three-dimensional test video 55A from the three-dimensional test video storage 55 and supplies the read video data to the output video selecting section 56. The output video selecting section 56 acquires the video data of the embedded three-dimensional test video 55A supplied from the three-dimensional test video selecting section 54 based on a control signal supplied from the video recording medium details confirming section 52, which indicates the selection of the three-dimensional test video, and supplies the acquired video data to the video output section 57. The video output section 57 D/A converts the video data of the embedded three-dimensional test video 55A supplied from the output video selecting section 56, if necessary, and outputs the converted data to the display device 3 in a predetermined format.

After the processes of step S5 and step S6, in step S7, the reproducing device 1 determines whether or not an operation indicating that preparations are completed to view the three-dimensional video 43 is performed, and waits until the operation indicating that preparations are completed is performed by a viewer.

In step S7, when it is determined that the operation indicating that preparations are completed to view the three-dimensional video 43 is performed, the process proceeds to step S8 and the reproducing device 1 reproduces the three-dimensional video 43.

More specifically, the video recording medium details confirming section 52 instructs the video reproducing section 53 to reproduce the three-dimensional video 43, based on the playlist 41. The video reproducing section 53 reproduces the three-dimensional video 43 recorded on the video recording medium 2 and supplies the video data obtained by the reproduction to the output video selecting section 56. The output video selecting section 56 acquires the video data of the three-dimensional video 43 supplied from the video reproducing section 53, based on a control signal supplied from the video recording medium details confirming section 52, which indicates the selection of the feature presentation video, and supplies the acquired video data to the video output section 57. The video output section 57 D/A converts the video data of the three-dimensional video 43 supplied from the output video selecting section 56, if necessary, and outputs the video data to the display device 3 with a predetermined format.

When the reproduction of the entire three-dimensional video 43 recorded on the video recording medium 2 is terminated, the reproducing process is terminated.

As described above, before the start of the reproduction of three-dimensional video 43 recorded on the video recording medium 2, the reproducing device 1 certainly displays the three-dimensional test video and waits until the viewer is ready to view the three-dimensional video 43. In addition, the reproducing device 1 starts to reproduce the three-dimensional video 43 after acquiring the viewer's operation indicating that preparations are completed.

As an example of reproducing the three-dimensional video 43 after the two-dimensional video 42, a case where the two-dimensional video 42 is a reproduction menu screen or a logo mark screen of a movie distributor and the three-dimensional video 43 is moving picture contents of a 3D movie or the like can be exemplified. In addition, a case where the two-dimensional video 42 is moving picture contents of a 2D movie and the three-dimensional video 43 is also moving picture contents of a 3D movie can be considered. In addition, a case where the two-dimensional video 42 is moving picture contents of a main 2D movie and the three-dimensional video 43 is a 3D movie that is attached as bonus moving picture contents or the like, can be considered.

In a case where the three-dimensional movie 43 of the video recording medium 2 is reproduced by the reproducing device 1, the reproduction certainly begins to start after the viewer is ready to view the three-dimensional video, whereby the viewer can view the three-dimensional video in stereovision from the beginning.

In the above-described embodiments, the three-dimensional test video 44 is made from a still image in a description with reference to FIG. 4, but may be made from moving pictures. For example, the three-dimensional test video 44 of the moving pictures may be moving pictures in which "a pencil" moves back and forth in the depth direction and moves left and right in the horizontal direction, as a stereovision object video.

In addition, in the above-described embodiments, when the three-dimensional test video 44 (or 55A) is displayed, the viewer can input only an operation of an OK button indicating that preparations are completed to view the three-dimensional video 43. However, it can be considered that a stereovision object video may not be perceived in three dimensions with the three-dimensional test video 44 because, for example, stereovision eyeglasses may not perform proper synchronization. In this case, the reproducing device 1 may allow the viewer to operate an NG button or the like. When the NG button is operated by the viewer, it is possible to make the reproducing device 1 perform a process of changing the display into a two-dimensional video display using only the L video from a plurality of L videos and R videos constituting the three-dimensional video 43.

With respect to the above-described embodiments, when the three-dimensional test video 44 is displayed, the reproducing device 1 may start to reproduce the three-dimensional video 43 after waiting a predetermined amount of time necessary for the viewer's preparation even though the operation of the OK button by a viewer is not performed. In this case, there is not necessary for the user to operate the OK button, whereby the operation becomes simple.

In the above-described embodiments, it is described that the two-dimensional video 42 is certainly reproduced before the reproduction of the three-dimensional video 43. However, even when the three-dimensional video 43 is reproduced from the beginning, it is needless to say that the three-dimensional test video 44 (or 55A) may be displayed.

In the present embodiments, there is described an example where the reproduction control of the invention, that is, the control of certainly displaying the three-dimensional test video in case of reproducing the three-dimensional video is adopted to the reproducing device 1, but it is also possible to be adopted to a recording and reproducing device having a recording function. For example, with respect to a recording and reproducing device prepared by providing a tuner and an encoder with the reproducing device 1 shown in FIG. 1, it is assumed that the two-dimensional video 42 and the three-dimensional video 43 received by the tuner is encoded by an MVC or the like to be stored in the local storage 17. In this case, even when the two-dimensional video 42 and the three-dimensional video 43 stored in the local storage 17 are reproduced in this order, it is possible to adopt the invention.

The series of processes described above may be implemented by hardware or software. In a case where the series of processes is implemented by software, a program constituting the software is installed on a computer. Here, the computer includes a computer on which exclusive hardware is mounted, a general-purpose personal computer that can implement various functions by installing various programs, or the like.

The program that is executed by the computer may be provided by being recorded on, for example, a removable recording medium as package media or the like. In addition, the program may be provided via a wire or wireless transmission medium such as a local area network, the Internet, and digital satellite broadcasting.

In addition, in this specification, the steps described in the flowchart may of course be implemented in time-series according to the described sequence, or may be implemented in parallel or at a necessary timing such as when being called, even if it is not implemented in time-series.

The present application contains subject matter related to that disclosed in Japanese Priority Patent Application JP 2010-061172 filed with the Japan Patent Office on Mar. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video content reproducing device comprising:
   a storage medium storing data representing a two-dimensional video and data representing a three-dimensional video;
   a converter selectively reproducing the two-dimensional video and the three-dimensional video; and
   a controller, which:
      receives a first signal for switching the video reproduced by the converter from the two-dimensional video to the three-dimensional video;
      directs the converter to reproduce a three-dimensional test video upon receiving the first signal;
      receives a second signal, from a viewer, indicating that preparations to perceive the three-dimensional video have been completed; and
      directs the converter to reproduce the three-dimensional video upon receiving the second signal.

2. The video content reproducing device according to claim 1, wherein the storage medium stores data representing the three-dimensional test video.

3. The video content reproducing device according to claim 1,
   wherein the controller:
      determines whether the three-dimensional test video is recorded on a video recording medium; and
      directs the converter to reproduce the three-dimensional test video from the video recording medium, when the three-dimensional test video is recorded on the video recording medium.

4. The video content reproducing device according to claim 1, further comprising:
   an input device receiving an input from the viewer confirming that the preparations to perceive the three-dimensional video have been completed,
   wherein the controller directs the converter to reproduce the three-dimensional video, when the input device receives the input.

5. A video content reproduction control method, comprising the steps of:
   storing data representing a two-dimensional video and data representing a three-dimensional video in a storage medium;
   receiving input, via an input device, which switches a video from a two-dimensional video to a three-dimensional video;

reproducing a three-dimensional test video;

receiving a signal, from a viewer, indicating that preparations to perceive the three-dimensional video have been completed; and reproducing the three-dimensional video upon receiving the signal.

6. A non-transitory computer-readable medium storing instructions for causing a computer to execute operations comprising:

receiving input indicating switching of a video from a two-dimensional video to a three-dimensional video;

reproducing a three-dimensional test video;

receiving a signal, from a viewer, indicating that preparations to perceive the three-dimensional video have been completed; and reproducing the three-dimensional video upon receiving the signal.

7. A video content reproducing device comprising:

a storage medium storing data representing a two-dimensional video and data representing a three-dimensional video;

a reproducing section, which selectively reproduces the two-dimensional video and the three-dimensional video recorded on a video recording medium; and a reproduction controller, which:

directs the reproducing section to reproduce a three-dimensional test video, when a viewer switches the video reproduced by the reproducing section from the two-dimensional video to the three-dimensional video; and directs the converter to reproduce the three-dimensional video, when the viewer confirms that preparations for perceiving the three-dimensional video have been completed.

* * * * *